(12) United States Patent
Morgenstern et al.

(10) Patent No.: US 6,935,592 B2
(45) Date of Patent: Aug. 30, 2005

(54) AIRCRAFT LIFT DEVICE FOR LOW SONIC BOOM

(75) Inventors: John M. Morgenstern, Lancaster, CA (US); Alan Arslan, Santa Clarita, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 0 days.

(21) Appl. No.: 10/651,410

(22) Filed: Aug. 29, 2003

(65) Prior Publication Data

US 2005/0045763 A1 Mar. 3, 2005

(51) Int. Cl.⁷ ................................. B64C 5/00
(52) U.S. Cl. ........................ 244/89; 244/90 R
(58) Field of Search ................. 244/89, 90 R, 244/123, 10

(56) References Cited

U.S. PATENT DOCUMENTS

| | | | | |
|---|---|---|---|---|
| 3,447,761 A | * | 6/1969 | Whitener et al. | 244/15 |
| 3,478,989 A | * | 11/1969 | Bielefeldt | 244/218 |
| 3,486,720 A | * | 12/1969 | Seglem et al. | 244/210 |
| 3,504,870 A | * | 4/1970 | Cole et al. | 244/119 |
| 3,556,439 A | * | 1/1971 | Autry et al. | 244/210 |
| 3,743,219 A | * | 7/1973 | Gorges | 244/210 |
| 4,025,007 A | * | 5/1977 | Kaniut | 244/15 |
| 4,161,300 A | | 7/1979 | Schwaerzler et al. | |
| 4,189,121 A | * | 2/1980 | Harper et al. | 244/214 |
| 4,262,868 A | * | 4/1981 | Dean | 244/214 |
| 4,351,502 A | * | 9/1982 | Statkus | 244/219 |
| 4,384,693 A | * | 5/1983 | Pauly et al. | 244/207 |
| 4,427,168 A | * | 1/1984 | McKinney et al. | 244/214 |
| 4,485,992 A | | 12/1984 | Rao | |
| 4,723,214 A | * | 2/1988 | Frei | 701/6 |
| 4,797,829 A | * | 1/1989 | Martorella et al. | 701/3 |
| 5,158,252 A | * | 10/1992 | Sakurai | 244/214 |
| 5,222,699 A | * | 6/1993 | Albach et al. | 244/213 |
| 5,282,591 A | * | 2/1994 | Walters et al. | 244/199 |
| 5,348,256 A | * | 9/1994 | Parikh | 244/208 |
| 5,681,013 A | * | 10/1997 | Rudolph | 244/214 |
| 5,927,656 A | | 7/1999 | Hinkleman | |
| 5,961,068 A | * | 10/1999 | Wainfan et al. | 244/36 |
| 6,015,117 A | | 1/2000 | Broadbent | |
| 6,152,404 A | * | 11/2000 | Flaig et al. | 244/199 |
| 6,293,497 B1 | | 9/2001 | Kelley-Wickemeyer et al. | |
| 6,575,406 B2 | * | 6/2003 | Nelson | 244/119 |
| 6,705,567 B2 | * | 3/2004 | Dong et al. | 244/13 |

OTHER PUBLICATIONS

Trifu, Octavian, Lift Enhancement by Aerodynamic Multi-parametric Optimization of a Wing–Strake Configuration, National Institute of Aerospace Research "elle Carafoll" Bd Pacii 220 77538 Bucharest.

Bradley C. Flick; Michael P. Thomson; Victoria A Regenie; Keith D. Wichman; Joseph W. Pahle; and Michael R. Earls, Design and Integration of an Actuated Nose Strake Control System, NASA Technical Memorandum 104324, Oct. 1996, pp. 1–27.

* cited by examiner

Primary Examiner—Teri Pham Luu
Assistant Examiner—Stephen A Holzen
(74) Attorney, Agent, or Firm—Koestner Bertani LLP; Ken J. Koestner

(57) ABSTRACT

An aircraft lift device comprises a strake capable of coupling to an aircraft fuselage and extending to a leading edge of a wing. The strake has a leading edge. The life device further comprises a leading-edge flap coupled to the strake leading edge.

17 Claims, 18 Drawing Sheets

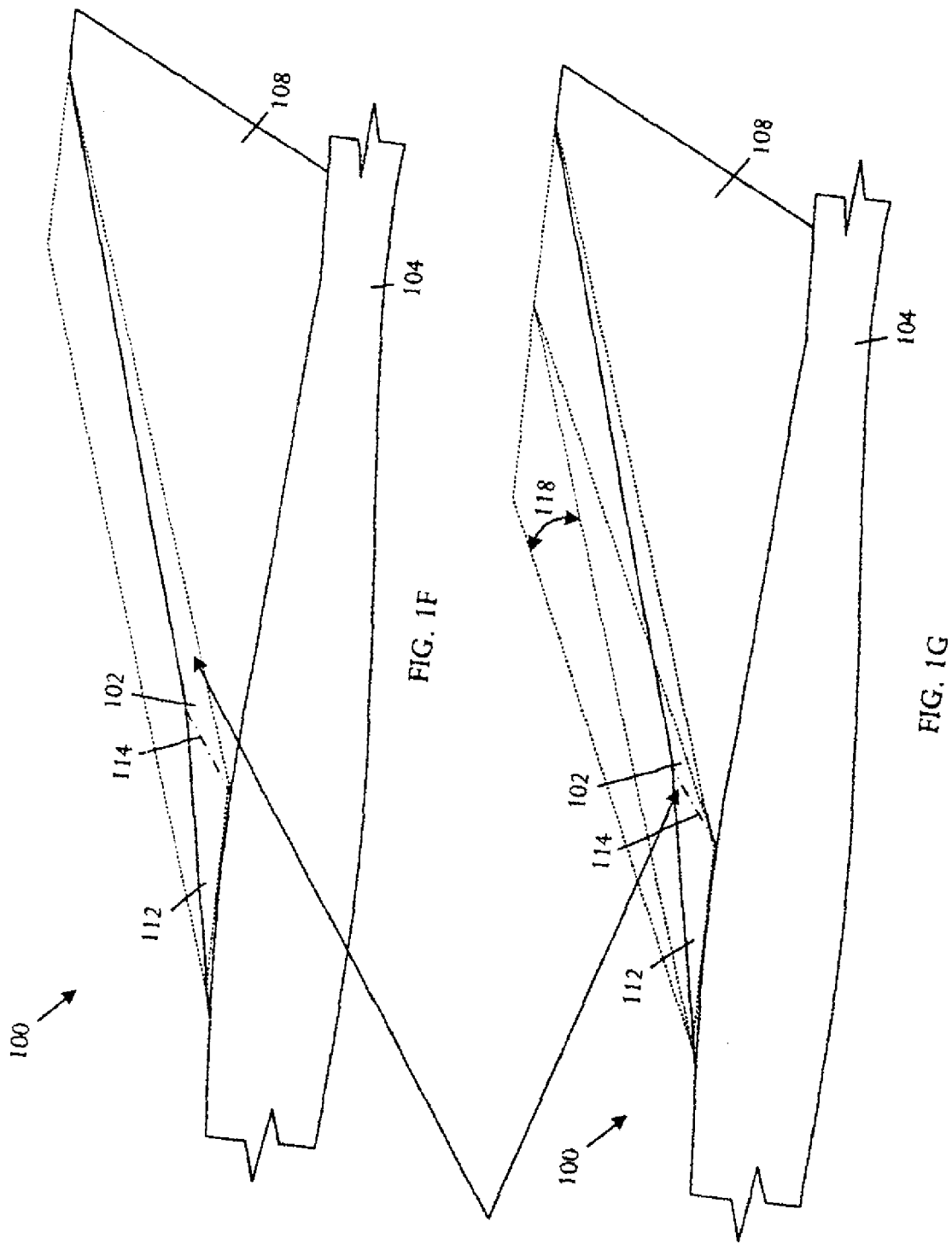

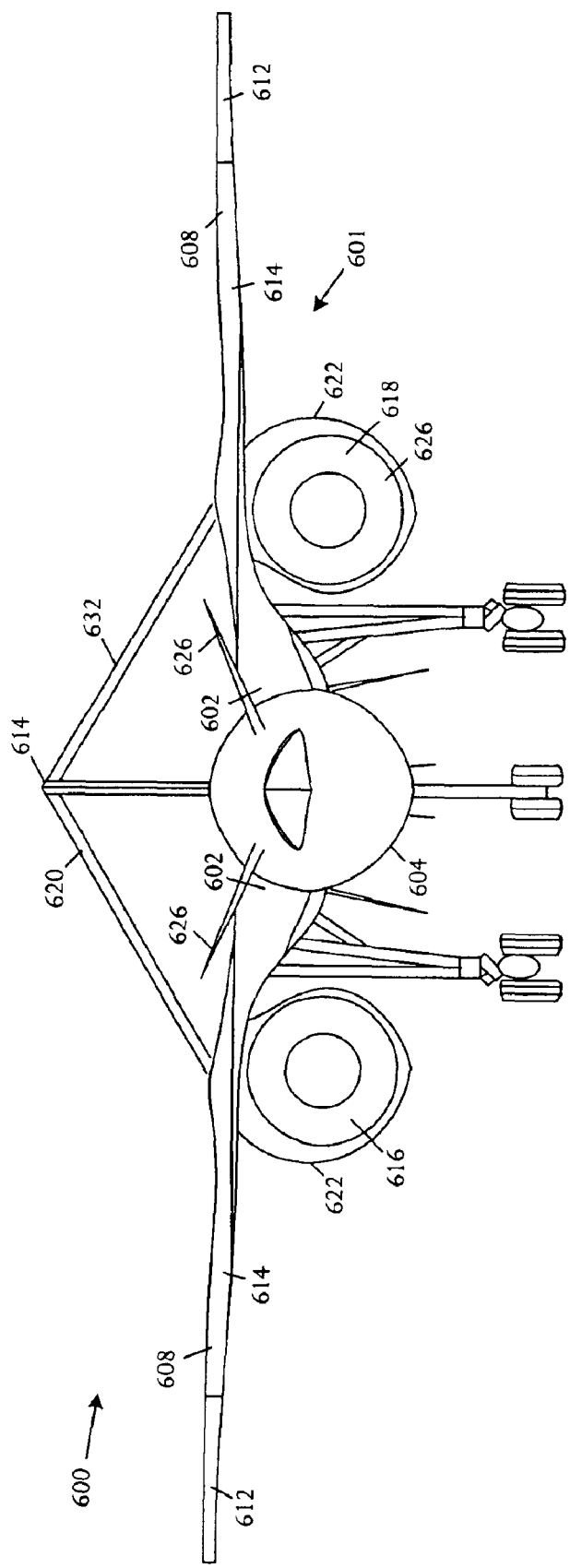

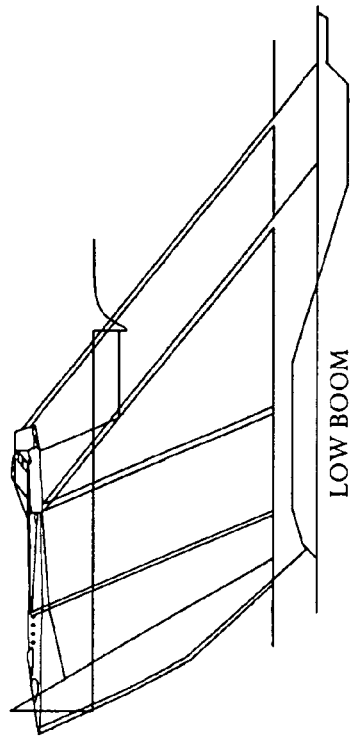
FIG. 7A CONVENTIONAL
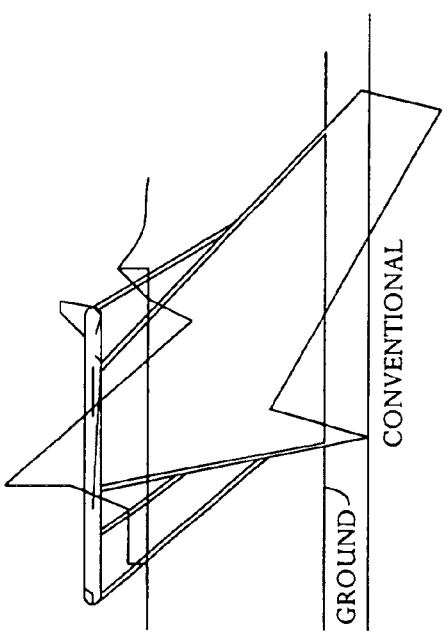
FIG. 7D LOW BOOM
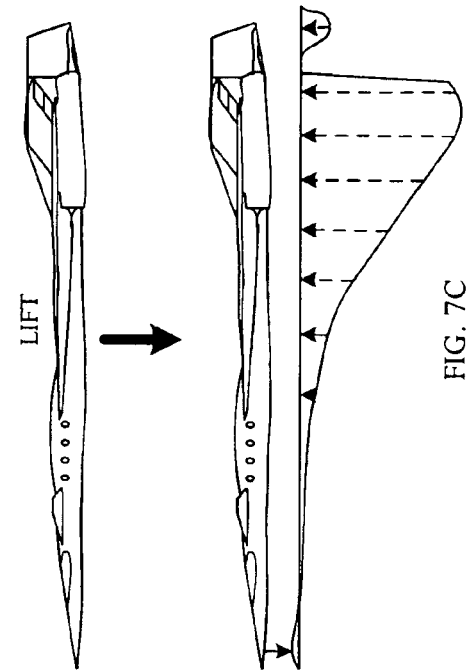
FIG. 7B AREA
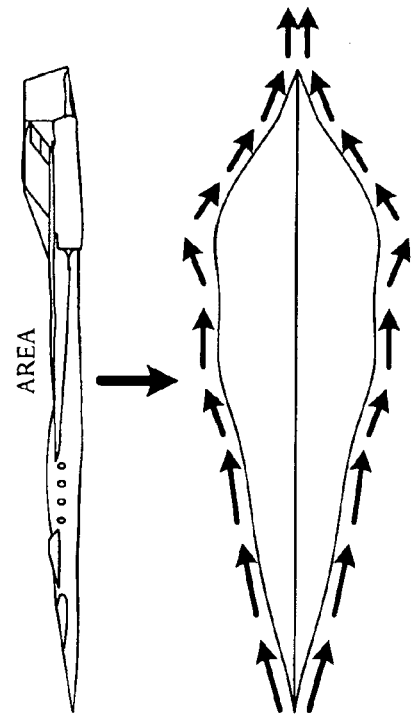
FIG. 7C LIFT

AIRCRAFT LIFT DEVICE FOR LOW SONIC BOOM

BACKGROUND OF THE INVENTION

Air travelers have long sought the convenience and efficiency of widespread supersonic commercial aviation only to be denied by technological, economic, and political roadblocks. With operations spanning over a quarter of a century, the Concorde remains the only commercial aircraft that travels at supersonic speeds but struggles with technological obsolescence. Fuel consumption and maintenance requirements of the Concorde strain commercial feasibility in today's competitive environment. Possibly overshadowing other technological and economic shortcomings is the Concorde's thunderous sonic boom that is capable of shattering windows in buildings under the flight path, a burden that restricts the Concorde to routes over oceans.

The sonic boom creates a major practical risk of commercial supersonic aviation so long as commercial supersonic aircraft are prohibited from flying over populated land masses.

A sonic boom occurs due to pressure waves that form when an aircraft moves at supersonic speeds. During subsonic flight, air displaced by an aircraft flows around the configuration the same way water goes around an object in a stream. However, as the aircraft approaches supersonic speeds, air at the leading edge of the configuration is compressed to a non-linear threshold where discontinuities in flow properties, manifest through a pressure pulse, are generated as shocks and propagated through the atmosphere. Pressure pulse intensity decreases as a consequence of propagation through the atmosphere and changes shape into an N-shaped wave within which pressure rises sharply, gradually declines, then rapidly returns to ambient atmospheric pressure. A wall of compressed air that moves at aircraft speed spreads from the wave and, in passing over ground is heard and felt as a sonic boom. Rapid changes in pressure at the beginning and end of the N-wave produce the signature double bang of the sonic boom.

Research has recently shown that boom intensity can be reduced by altering aircraft shape, size, and weight. For example, small airplanes create a smaller amplitude boom due to a lower amount of air displacement. Similarly, a lighter aircraft produces a smaller boom since the aircraft rests on a smaller column of compressed air and the lighter plane generates a lower pressure column for a similar signature, for example N-wave. An aircraft that is long in proportion to weight spreads the overpressure across a greater distance, resulting in a lower peak pressure. Furthermore, wings that are spread along the body and not concentrated in the center as in a conventional aircraft have a greater lifting length and produce a pressure pulse that is similarly spread, resulting in a smaller sonic boom.

One technique for boom reduction is shaping. Shaped sonic boom refers to a technique of altering source pressure disturbance such that a non-N-wave shape is imposed on the ground. Shaping sonic boom can reduce loudness by 15–20 dB or higher with no added energy beyond that to sustain flight. Shaping to minimize loudness is based on insight regarding changes in aircraft pressure disturbances during propagation to the ground. During the sixties and seventies, Jones, Seebass, George, and Darden developed a practical analytical guideline for low boom design.

Studies have shown that sonic boom loudness at audible frequencies correlates with annoyance. Therefore supersonic over-land flight could only be achieved by reducing the sonic boom to acceptable sound levels. Shaped sonic booms are only achieved deliberately. No existing aircraft creates a shaped sonic boom that persists for more than a fraction of the distance to the ground while flying at an efficient cruise altitude, since non-shaped pressure distributions quickly coalesce into the fundamental N-wave shape. Audible frequencies for a sonic boom occur essentially at the beginning and end of a typical N-waveform. Shocks become quieter at decreasing magnitudes and increasing rise times of the pressure change. The N-wave form generates the largest possible shock magnitude from a particular disturbance. The N-wave shape results because the front of a supersonic aircraft generates an increase in ambient pressure while the rear generates a decrease in pressure. Variation in propagation speed stretches the disturbance during propagation to the ground. The disturbances stretch and also coalesce because shocks travel at speeds that monotonically change with magnitudes of the local pressure. Shaped boom techniques typically attempt to prevent coalescing of the pressure disturbance by adding a large compression at the aircraft nose and an expansion at the tail with pressure between constrained between compression and expansion. The shaped boom stretches the ends of the signature faster than the in-between pressures, creating a non-N-wave sonic boom at the ground.

SUMMARY OF THE INVENTION

What are desired are airfoils and lift devices that facilitate sonic boom reduction and enable good off-design performance and control characteristics.

In accordance with some embodiments of the disclosed aeronautical system, an aircraft lift device comprises a strake capable of abutting to an aircraft fuselage and extending to a leading edge of a wing. The strake has a leading edge. The lift device further comprises a leading-edge flap mounted on the strake leading edge.

In accordance with other embodiments, an aircraft lift device comprises an aircraft wing capable of coupling to an aircraft fuselage and having a leading edge extending along the wing inboard to outboard, and a strake capable of coupling to the aircraft fuselage and extending to the leading edge of the wing. The lift device further comprises a Krueger flap coupled to the leading edge of an inboard portion of the wing adjacent the strake and a simple leading edge flap mounted to the leading edge of the wing and extending from a junction at the Krueger flap to an outboard portion of the wing. The strake leading-edge flap is operable as a leading-edge device so that, for subsonic performance, the leading-edge strake flap can be deflected to create an airflow field impinging on the Krueger flap so that the upper surface airflow field reduces or eliminates inboard vortices.

According to further embodiments, an aircraft comprises a fuselage, an aircraft wing coupled to the fuselage and having a leading edge, the wing extending inboard to outboard, and a strake capable of coupling to the fuselage and extending to the leading edge of the wing. In some embodiments, the aircraft further comprises a Krueger flap coupled to the leading edge of an inboard portion of the wing adjacent the strake and a simple leading edge flap coupled to the leading edge of the wing and extending from a junction at the Krueger flap to an outboard portion of the wing.

BRIEF DESCRIPTION OF THE DRAWINGS

Embodiments of the invention relating to both structure and method of operation, may best be understood by referring to the following description and accompanying drawings.

FIGS. 1F and 1G are schematic pictorial diagrams showing top views of an embodiment of the leading edge strake flap to illustrate aerodynamic influence of the flap in operation.

FIGS. 6A, 6B, and 6C are schematic pictorial diagrams respectively depicting side, front, and top views of a supersonic aircraft that can utilize the illustrative lift devices.

FIGS. 7A, 7B, 7C, and 7D are a series of graphs that illustrate theory upon which a low sonic boom signature is attained by controlling the leading edge flaps of the wings.

DETAILED DESCRIPTION OF THE EMBODIMENTS

Figure 1B:
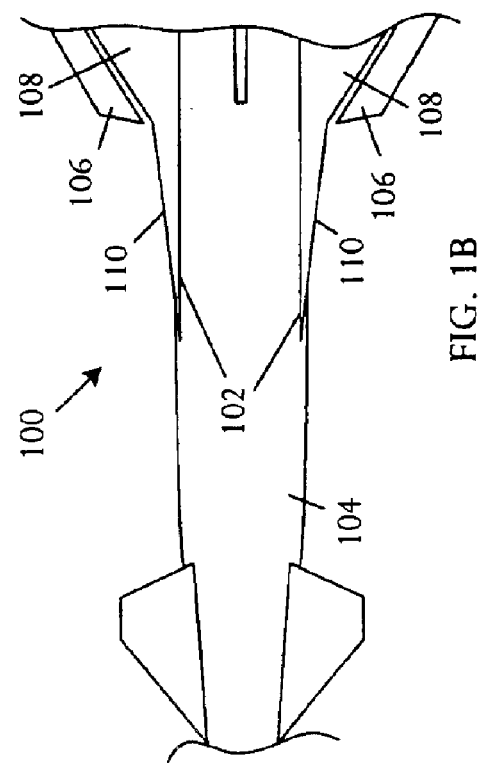
FIGS. 1A, 1B, and 1C are schematic pictorial diagrams respectively illustrating side, top, and three-dimensional perspective views of an embodiment of an aircraft leading-edge flap.
Figure 1A:
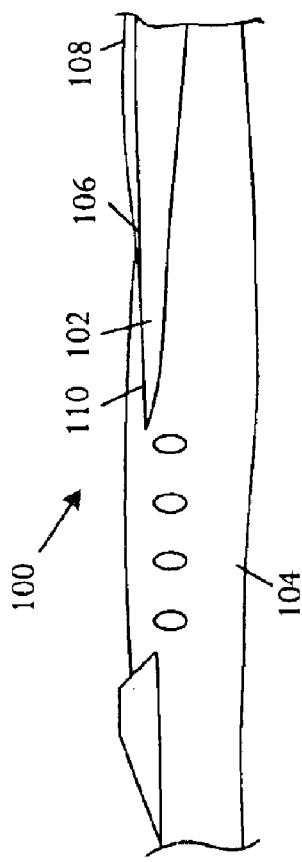
Figure 1C:
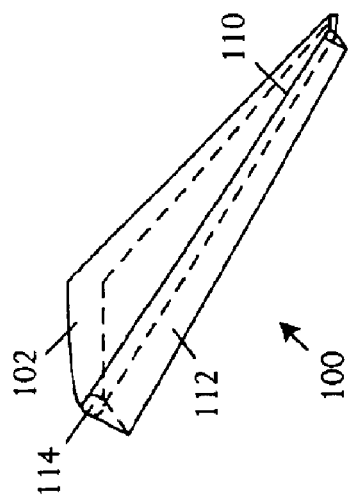

Referring to FIGS. 1A, 1B, and 1C, schematic pictorial diagrams respectively illustrate side, top, and three-dimensional perspective views of an embodiment of an aircraft lift device 100 for usage on an aircraft. The aircraft lift device 100 includes a strake 102 that couples to an aircraft fuselage 104 and extends along a portion of the aircraft fuselage 104 to a leading edge 106 of a wing 108. A strake 102 is generally a small aspect ratio lifting surface 110 with large sweep angles. A strake 102 is typically used as a vortex lift generator. The aircraft lift device 100 further comprises a simple leading-edge flap 112 coupled to the strake leading edge 110.

In various embodiments, the strake leading-edge flap 112 can extend over a portion of the length of the strake 102 or can extend the full span of the strake 102. In the illustrative embodiment, the strake leading-edge flap 112 is a simple or plain flap. In the simple flap, a portion of the leading edge 110 can have a hinged pivot 114 or can be driven by a wheel on rail type of mechanism as in commercial jets. The pivot or other moveable structure enables movement of the strake leading-edge flap 112 to move downward. The leading-edge flap 112 can be controlled to improve aerodynamic flow fields for flight at Mach numbers different from the Mach number to which the aircraft design is optimized. Operation of the strake leading edge flap 112 improves aerodynamic performance at off-design conditions.

The strake leading-edge flap 112 can also be controlled to deflect the strake 102 to reduce lift ahead of spillage at an off-design condition and maintain a low sonic boom signature.

In the illustrative system, the strake 102 is used as a leading edge flap device. The strake 102 is usually is configured to function as a subsonic leading edge even at supersonic conditions. The strake 102 functions as a vortex lift generator and is positioned in front of the leading edge 106 of the wing 108 that has a smaller sweep angle and a larger aspect ratio than the strake 102. The strake 102 creates spiral vortices by separating flow at the leading edge 110 of the strake 102. The flow reattaches one the wings' upper side, producing a nonlinear lift due to depression on the strake 102 and on portions of the wing 108.

In various embodiments, either entire strake 102 or a portion is used as a leading edge device. The strake leading-edge flap 112 can be controlled to improve aircraft performance and utility. For example, the strake leading-edge flap 112 can be controlled to adjust the air flow fields around the wing 108 and airfoil at different air speeds. For a wing 108 that is designed for most aerodynamic performance at a particular Mach number or range of Mach numbers, for example 1.6 to 1.8, the leading-edge flap 112 can be controlled to adjust aerodynamic flow fields to the actual Mach number during flight. In a specific example, if a wing is designed for most aerodynamic performance at Mach 1.6 and airspeed of Mach 1.8 is desired, the strake leading-edge flap 112 can be adjusted to produce flow fields to optimize the airfoil for Mach 1.8 conditions. Flow fields are most affected by airfoil shape and form at the leading edge which sets the form of the downwash on the wing 108. Accordingly, the strake leading-edge flap 112 can be controlled to optimize airfoil effective shape to adjust the optimum Mach number of the aircraft.

The strake can be controlled, deflected up and down to control sonic boom signature, for example to manage or reduce air spillage and also to improve drag when flying at off-design Mach conditions.

Figure 1D:
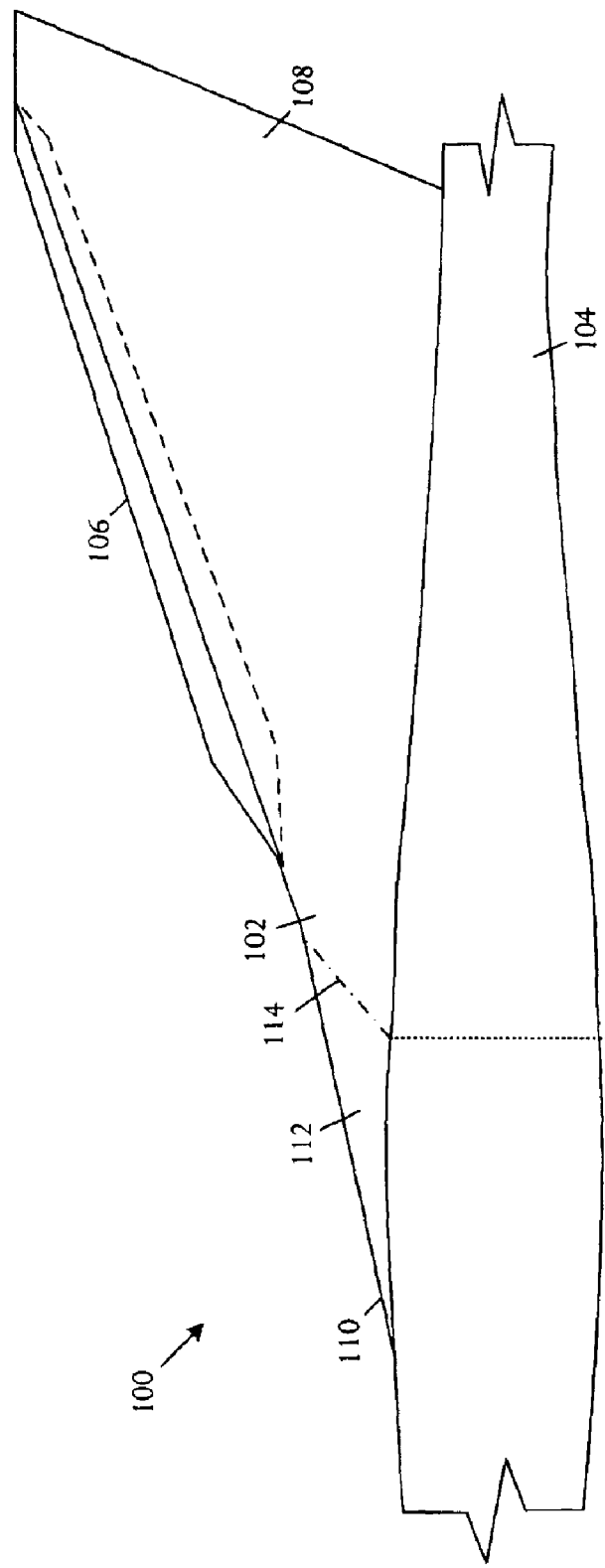
FIGS. 1D and 1E are pictorial diagrams respectively showing bottom and side views of an embodiment of a leading edge strake flap, particularly showing a swept hinge line of the strake flap.
Figure 1E:
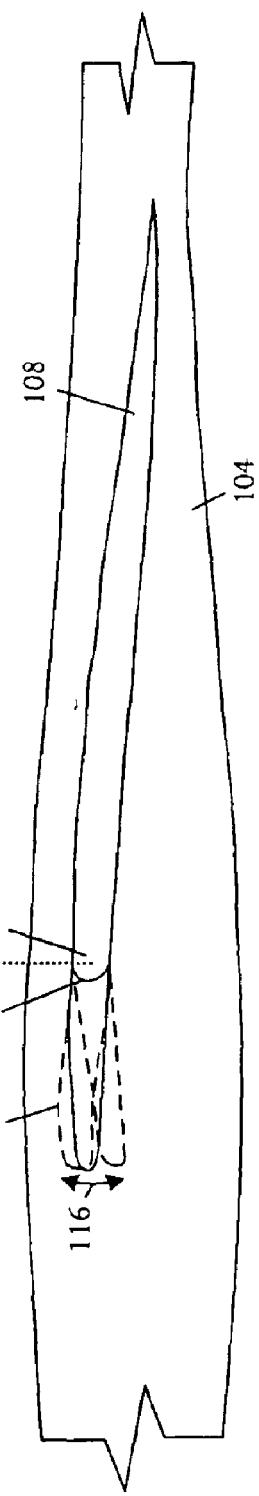

Referring to FIGS. 1D and 1E, pictorial diagrams respectively show bottom and side views of an embodiment of a leading edge strake flap 112, particularly showing a swept hinge line 114 of the strake flap 112. The swept hinge line 114 enables strake flap rotation without unsealing the flap 102 from the fuselage 104. FIG. 1E depicts the range of motion 116 of the leading edge stake flap 112.

Referring to FIGS. 1F and 1G, schematic pictorial diagrams show top views of an embodiment of the leading edge strake flap 112 to illustrate aerodynamic influence of the flap 112 in operation. As Mach number is reduced, as shown in FIG. 1G in comparison to FIG. 1F, the leading edge flap's influence moves ahead of the wing, shown by movement 118. Therefore, the optimal deflection of the leading edge strake flap 112 tends to change when Mach changes. In addition, sonic boom lift distribution constraints tend to benefit from deflection. From another perspective, flight not constrained for sonic boom has a reduced drag penalty when the strake leading edge flap 112 is deflectable.

Figure 2A:
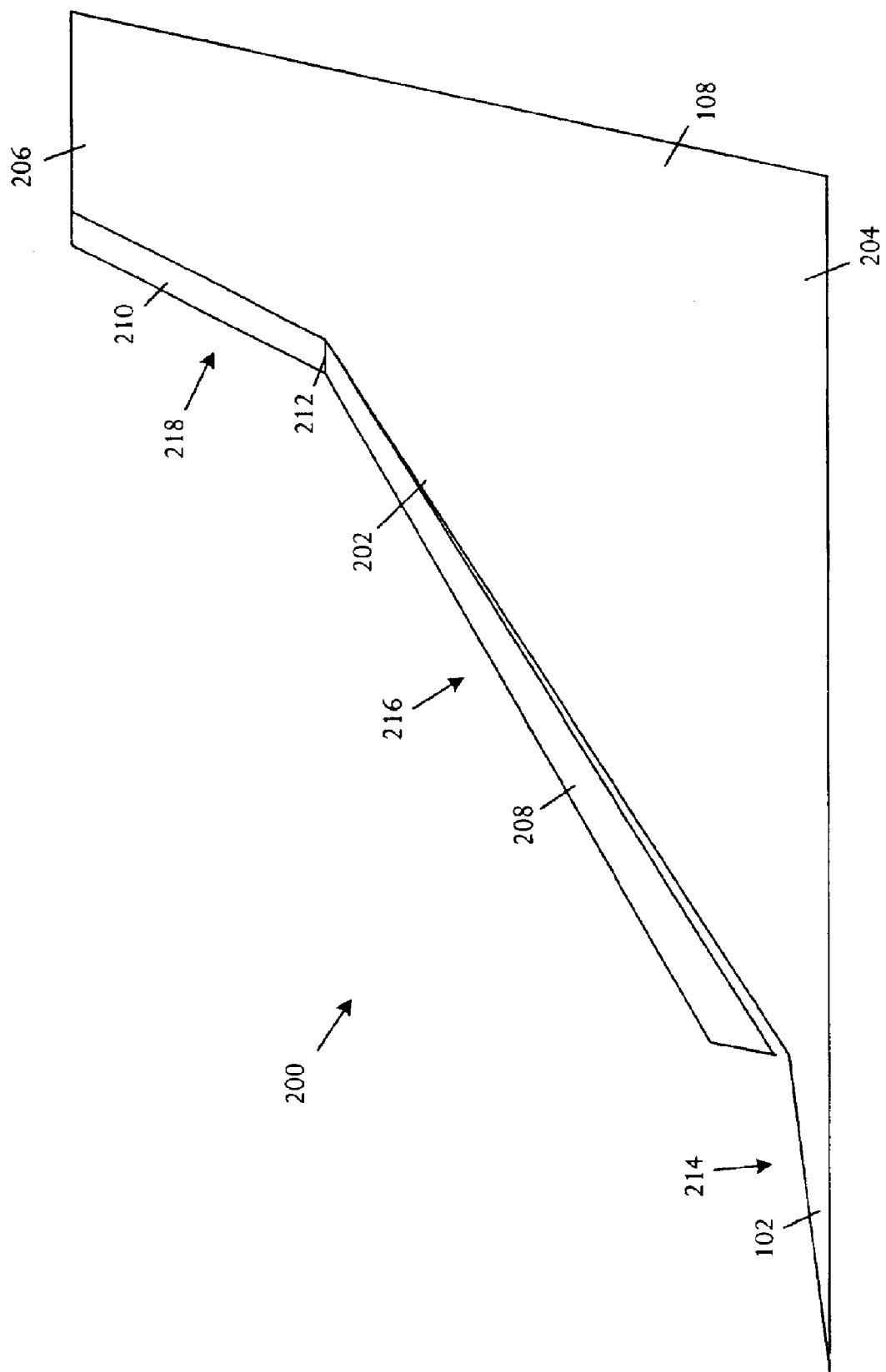
FIG. 2A is a schematic pictorial diagram showing a top pictorial view of an embodiment of an aircraft lift device.

Referring to FIG. 2A, a schematic block diagram illustrates an embodiment of an aircraft lift device 200 comprising an aircraft wing 108 that can mount onto an aircraft fuselage. The aircraft lift device 200 has a leading edge 202 extending along the wing inboard 204 to outboard 206, and a strake 102 that can couple to the aircraft fuselage and extend from the fuselage to the leading edge 202 of the wing 108. In the illustrative embodiment, the leading edge 202 is formed as a Krueger flap 208 that is outboard of the strake 102 and inboard of a simple flap 210. The Krueger flap 208 and the simple flap 210 generally have different leading edge structures. In other embodiments, the entire leading edge may be a single structure or may have multiple leading edge segments. For example, in some embodiments, the Krueger flap 208 can extend from the strake 102 to the wing tip. The aircraft lift device 200 further comprises a Krueger flap 208 coupled to the leading edge 202 at a relatively inboard portion of the wing adjacent the strake 102, and a simple leading edge flap 210 coupled to the leading edge 202 of the wing 108 and extending from a junction 212 at the Krueger flap 208 to an outboard portion 206 of the wing 108.

The strake leading-edge flap 112 is operable as a leading-edge device so that, for subsonic performance, the leading-edge strake flap can be deflected to create an airflow field impinging on the Krueger flap 208 so that the upper surface airflow field reduces or eliminates inboard vortices.

The wing 108 and strake 102 are both arranged at a sweep angle from the fuselage and form a swept wing that extends at a sweep angle from the fuselage. In the illustrative embodiment, the wing 108 and strake 102 are configured with different sweep angles to form a swept wing that extends in a plurality of sweep angle segments 214, 216, and 218 from the fuselage. For example, the sweep angle of the wing 108 differs from the sweep angle of the strake 102. For example, the sweep angle of the wing segment 216 inboard of the Krueger flap junction 212 can differ from the sweep angle of the wing segment 218 outboard of the Krueger flap junction 212. In other embodiments, the sweep angles may be the same for the wing 108 and strake 102.

The illustrative airfoil includes a leading edge 202 with two leading edge breaks to form a segmental variation of sweep angle along the wing 108.

In operation, the leading edge flaps, including the Krueger flaps 208 and the leading edge flaps 210, are extended for low speed operations during takeoff, approach, and landing. In a particular example, leading edge flaps can be extended up to 130 degrees to improve lift-to-drag ratio in a range around 1.5 to 2.5, resulting in better climb performance, and reduced takeoff and landing field length.

Figure 2B:
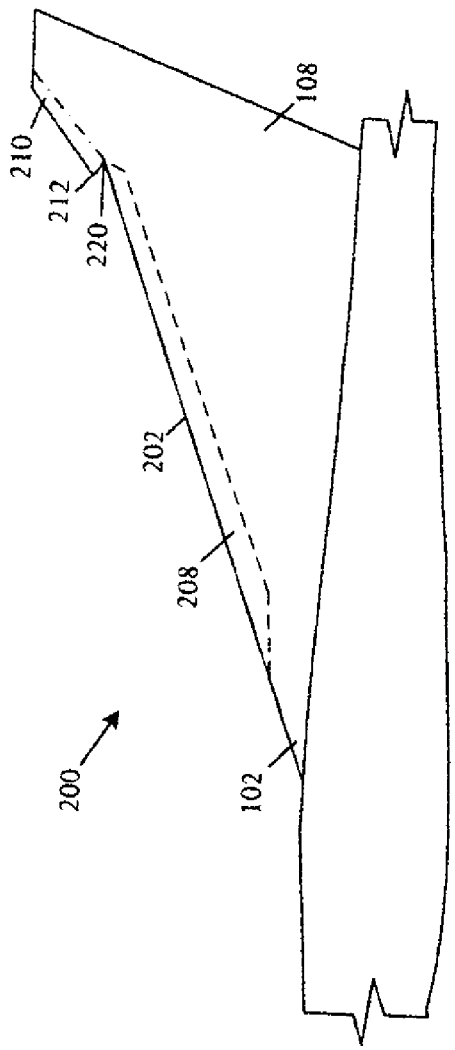
FIGS. 2B and 2C are schematic pictorial diagrams showing top pictorial views of an embodiment of an aircraft lift device with a Krueger flap in non-deployed and deployed positions, respectively.
Figure 2C:
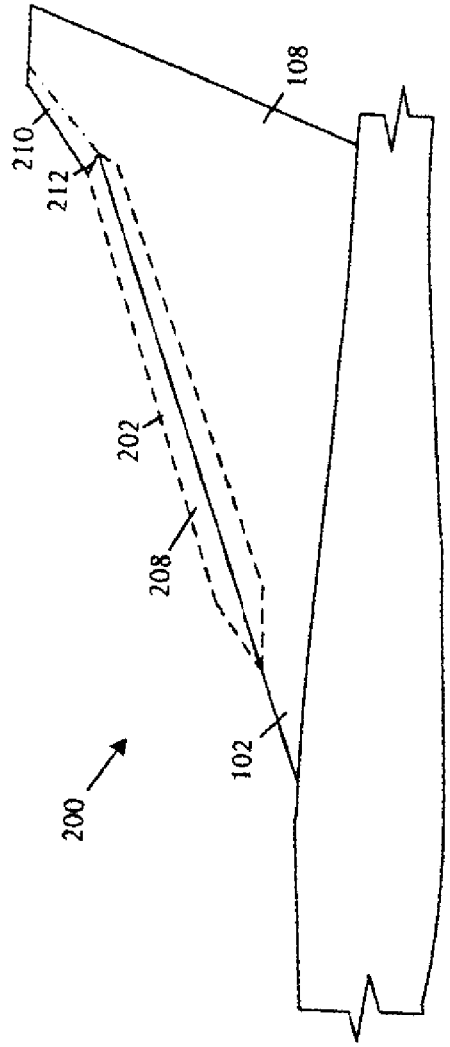

Referring to FIGS. 2B and 2C, schematic pictorial diagrams show top pictorial views of an embodiment of an aircraft lift device with a Krueger flap 208 in respective non-deployed and deployed positions. As shown in FIG. 2B, with the Krueger flap 208 in the retracted position, the leading edge 202 transitions inboard to outboard along the retracted Krueger flap 208 to the junction with the leading edge plain flap 210. The intersection between the retracted Krueger flap 208 and the leading edge plain flap 210 forms a sharp leading edge angle, termed a dog-toothed arrangement 220. As shown in FIG. 2C, the deployed Krueger flap 208 meets and seals with the deflected outboard leading edge plain flap 210.

Figure 3A:
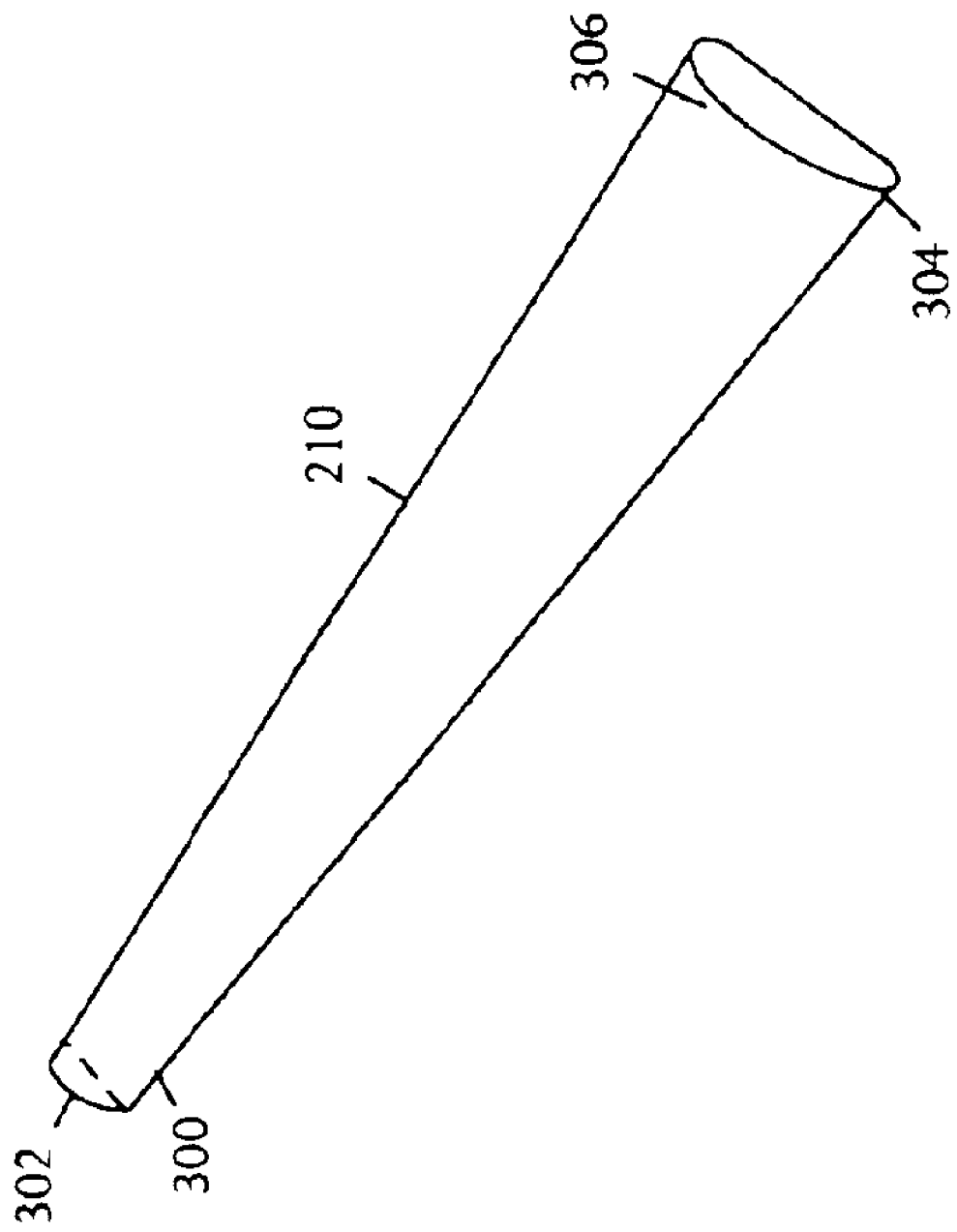
FIG. 3A is a schematic pictorial diagram that illustrates an example of a leading edge flap for usage in the aircraft lift device shown in FIG. 2.

Referring to FIG. 3A, a schematic pictorial diagram illustrates a perspective pictorial view of an example of a simple leading edge flap 210. In an illustrative embodiment, the leading edge flap 210 is a simple leading edge flap having a cross-sectional form transitioning from a sharp or pointed form 300 at the outboard end 302 to a rounded form 304 at the Krueger flap junction 306. The variable form of the leading edge flap 210 from the outboard sharp point transitioning to a more rounded form in the inboard direction to a junction with the Krueger flap reduces or minimizes sharp edges or gaps in the wing leading edge. Some aircraft embodiments may omit the simple flap 210 and have a Krueger flap 208 that extends to the wing tip.

In various embodiments, the leading edge flap 210 at the outboard end 302 can have varying degrees of sharpness or pointed character. In general, the leading edge flap 210 transitions from an edge with a relatively small radius of curvature at the outboard end 302 to an edge with a relatively larger radius of curvature at the inboard end a the Krueger flap function 306.

Although, the leading edge flap 210 is depicted as a simple LE flap in the illustrative embodiment, in some combinations other types of flaps can be used. For example, some arrangements can use a split flap in the spanwise direction, in which a hinged portion of the bottom surface of the wing can be extended to increase the angle of attack by changing the chord line. In other configurations, a Fowler flap can be used that, when extended, both tilts downward and also slides rearward. In other systems, a slotted flap may be used that, in addition to changing the wing camber and chord line, also allows some high pressure air beneath the wing travel through the slot. Other embodiments can use any other suitable type of flap. Furthermore, some embodiments, for example configurations in which the leading edge is subsonic, may omit usage of the leading edge flap 210.

Figure 3B:
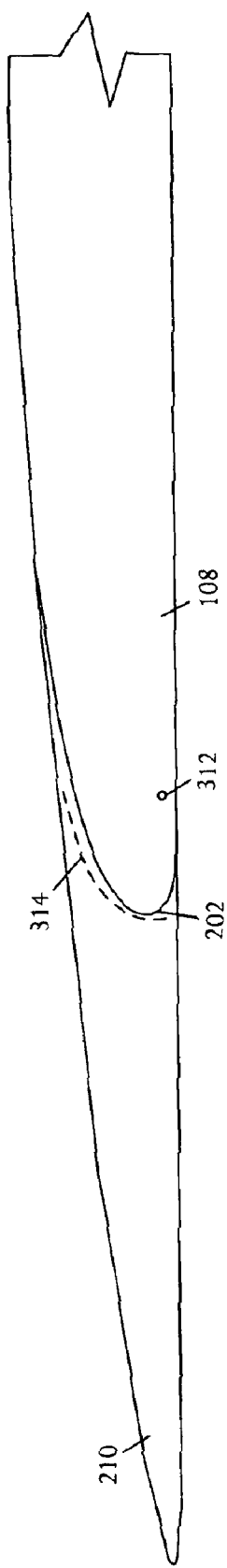
FIGS. 3B and 3C are pictorial cross-sectional partial airfoil views showing an embodiment of the transition from the inboard to outboard leading edge.
Figure 3C:
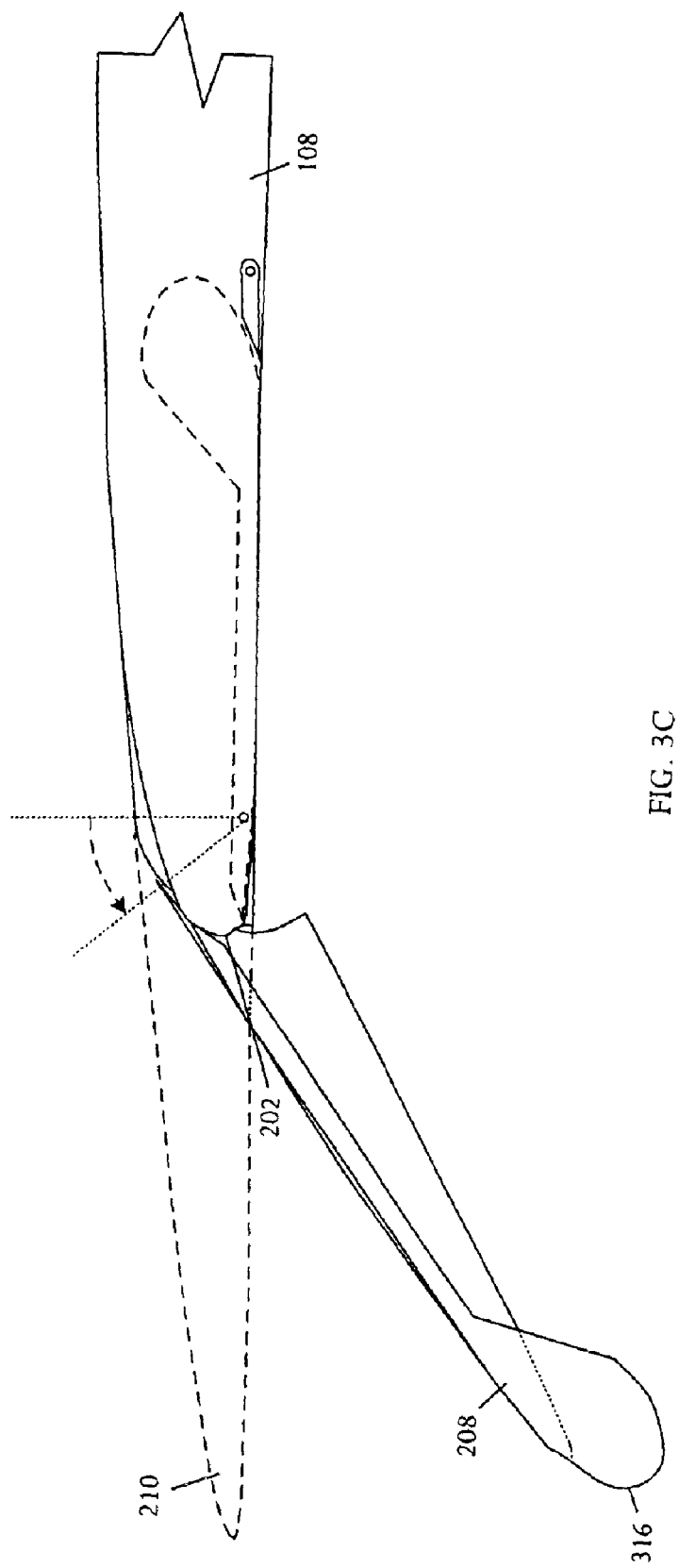

Referring to FIGS. 3B and 3C, pictorial cross-sectional partial airfoil views showing an embodiment of the transition from the inboard to outboard leading edge. FIG. 3B illustrates the transition from a round inboard leading edge 202 to the outboard dog-toothed, sharp leading edge flap 210. The sharp plain leading edge flap 210 pivots about a pivot point 312 along a hinge line 314. Also shown is a portion of the wing 108 under the flap surface.

FIG. 3C shows the transition from the round Krueger flap 208 to the dog-toothed, sharp plain leading edge flap 210. The Krueger flap 208 has a round leading edge radius 316 that gradually blends to a sharp edge moving inboard to outboard along the leading edge 202. The gradual tapering from rounded to sharp of the Krueger flap leading edge encourages attached flow and thereby lowers drag.

Figure 4A:
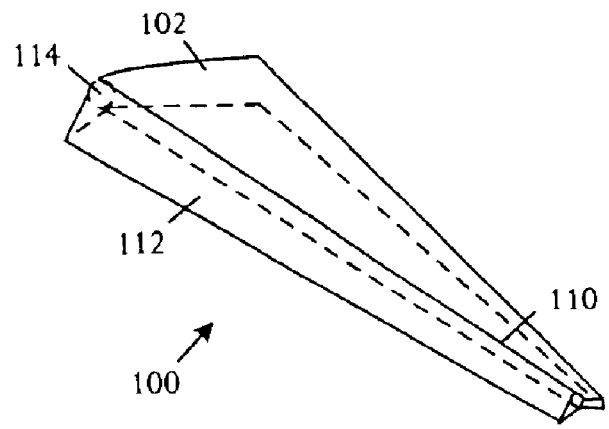
FIGS. 4A, 4B, and 4C are schematic pictorial diagrams showing embodiments of different airfoil planforms.
Figure 4B:
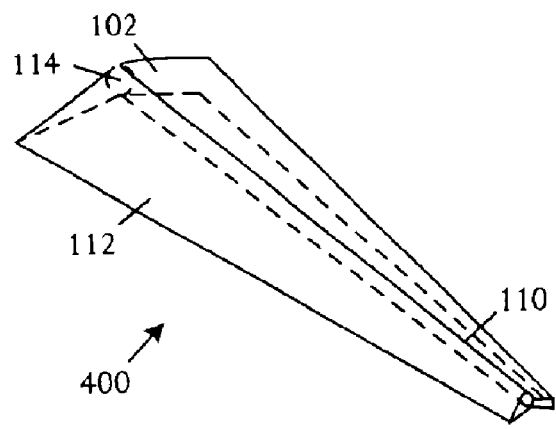
Figure 4C:
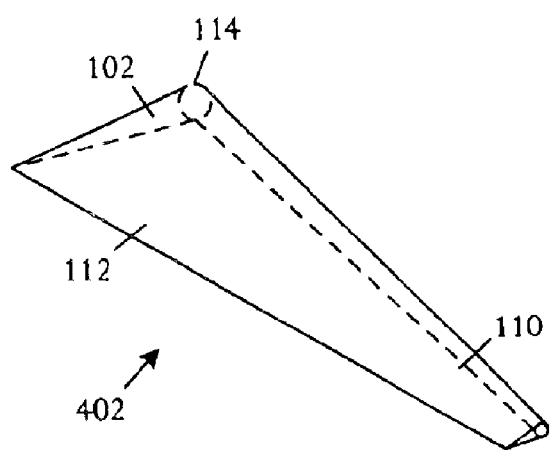

Referring to FIGS. 4A, 4B, and 4C, schematic pictorial diagrams show various planform embodiments of aircraft lift devices 100, 400, and 402, respectively. In various embodiments, an aircraft lift device, for example devices 100, 400, 402, or others, is comprised of a simple leading-edge flap 110 mounted to a strake 102 of a highly swept leading edge supersonic planform. The supersonic planform includes a wing and a body, also called a fuselage. The leading-edge flap 110 may include the entire strake 102 and sweeps about a body junction. The hinge line or pivot 114 may vary from a direction that is orthogonal to the fuselage to a configuration that is parallel to the strake leading-edge.

The leading-edge device 100, 400, 402 is used to soften the sonic-boom signature for a given supersonic configuration and/or improve aerodynamic performance, in other words lower drag, at off design conditions such as lower or higher cruise Mach numbers. If a Krueger flap is used as a leading-edge device for subsonic performance the leading-edge strake device, when deflected, facilitates formation of a favorable flow field for the Krueger flap so that the upper surface flow field is substantially free from inboard vortices. A smooth transition of simple leading-edge flap device to a Krueger flap similarly assists in avoidance of inboard vortices.

Figure 5A:
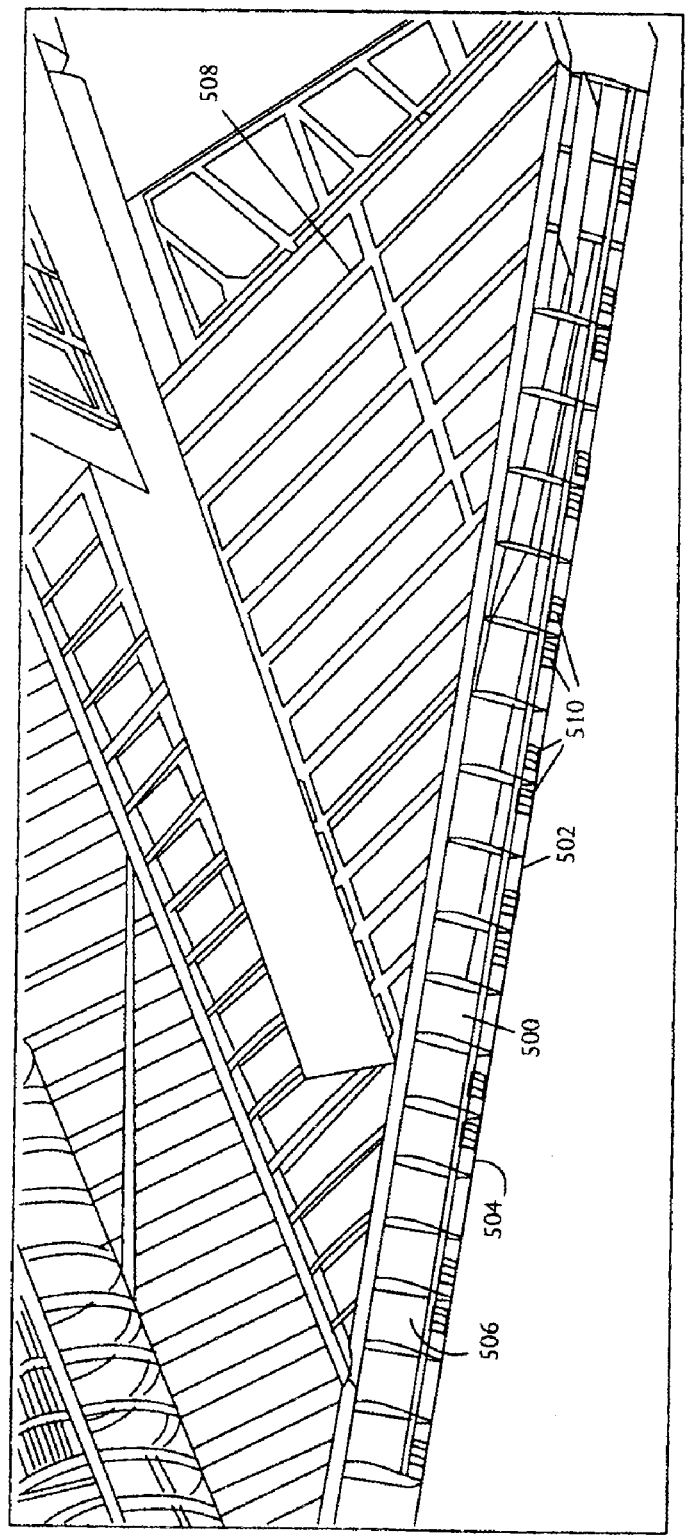
FIGS. 5A and 5B are schematic pictorial diagrams showing an embodiment of a Krueger flap in different perspective views.
Figure 5B:
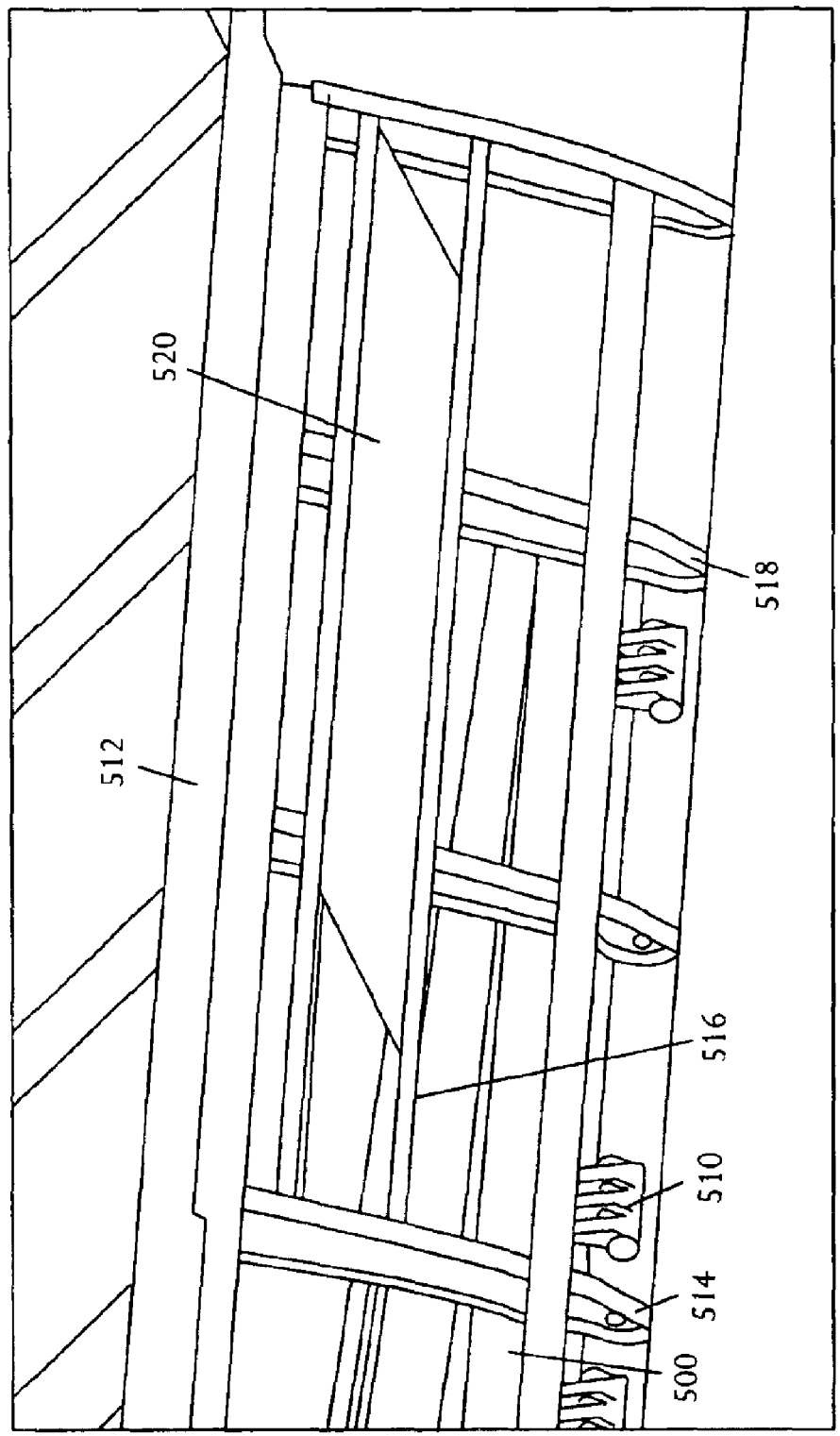

Referring to FIGS. 5A and 5B, two schematic pictorial diagrams show an embodiment of a Krueger flap 500. Krueger flaps 500 are aerodynamically-effective movable components on the leading edge of the airfoil, high-lift devices that supply additional lift in certain configurations and under certain flight attitudes. Krueger flaps 500 are connected to the leading edge 502 of the wing 508 and extend from the wing lower surface 504 to increase lift capability during low-speed operation. High-lift devices, such as Krueger flaps 500, facilitate lift-off and landing at low speeds, and maintain undisturbed wing root airflow over the wing upper surface 506 without separation at the transition from fuselage to wing 508.

In an illustrative embodiment, the leading edge Krueger flaps 500 include two surfaces, inboard and outboard, which rotate out 145°. The surfaces are driven by rotary actuators 510, with multiple slices connected to each panel. The slices are interconnected with torque tubes, and the entire assembly is driven by a central power drive unit (PDU). The PDU will be located in the wing root area. A position sensor and an asymmetry brake are located on the outboard end of the rotary actuator assembly.

From the stowed position, the rotary actuators 510 can rotate the Kruger flap 500 downward and forward from the lower surface 504 of the wing 508. The illustrative Krueger flap 500 shows one example of a suitable rotary actuator 510 that is suitable for usage in a wing 508 or other airfoil. In general, any Krueger flap with appropriate configuration, aerodynamic configuration, and actuating mechanism can be used. Generally, a suitable Krueger flap has an actuating mechanism capable of forming the wing leading edge configuration into a rigid airfoil structure at multiple different operating positions maintaining short and efficient load paths. Furthermore, a suitable Krueger flap has a control linkage mechanism that is stable at the different operating positions and deflects downward when actuated through a range of selected rotational angles while maintaining a substantially smooth wing surface with an aerodynamic, relatively constant radius of curvature. The actuating linkage operates to controllably stow and deploy the flap 500 during takeoff and landing, and for usage as a speed brake, if desired, during either high or low-speed in-flight operating conditions.

FIG. 5B shows a close-up view of a portion of the Krueger flap 500 in greater detail. Details shown include a left wing front spar 512, left Krueger flap hinge point 514, a flight spoiler hinge beam 516, left leading edge rib 518, and left outboard flight spoiler 520.

Figure 5C:
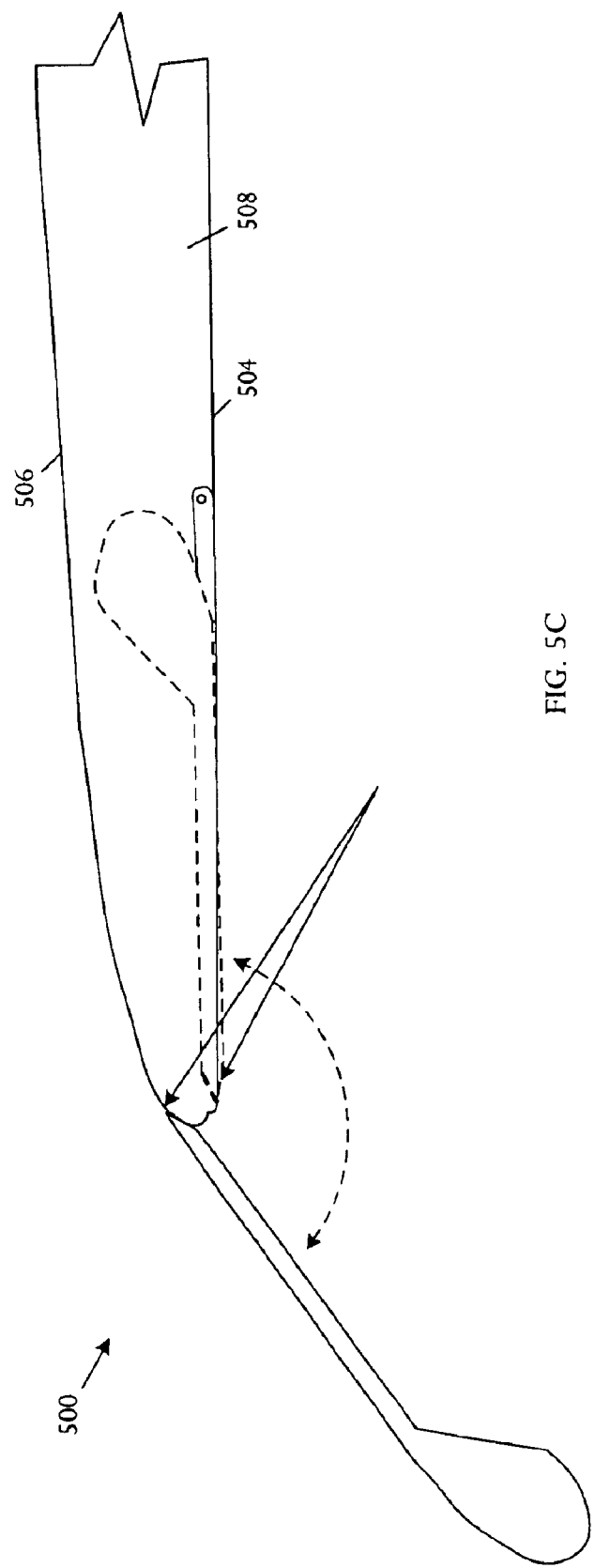
FIGS. 5C and 5D are pictorial cross-sectional partial airfoil views showing two embodiments of Krueger flap arrangements.
Figure 5D:
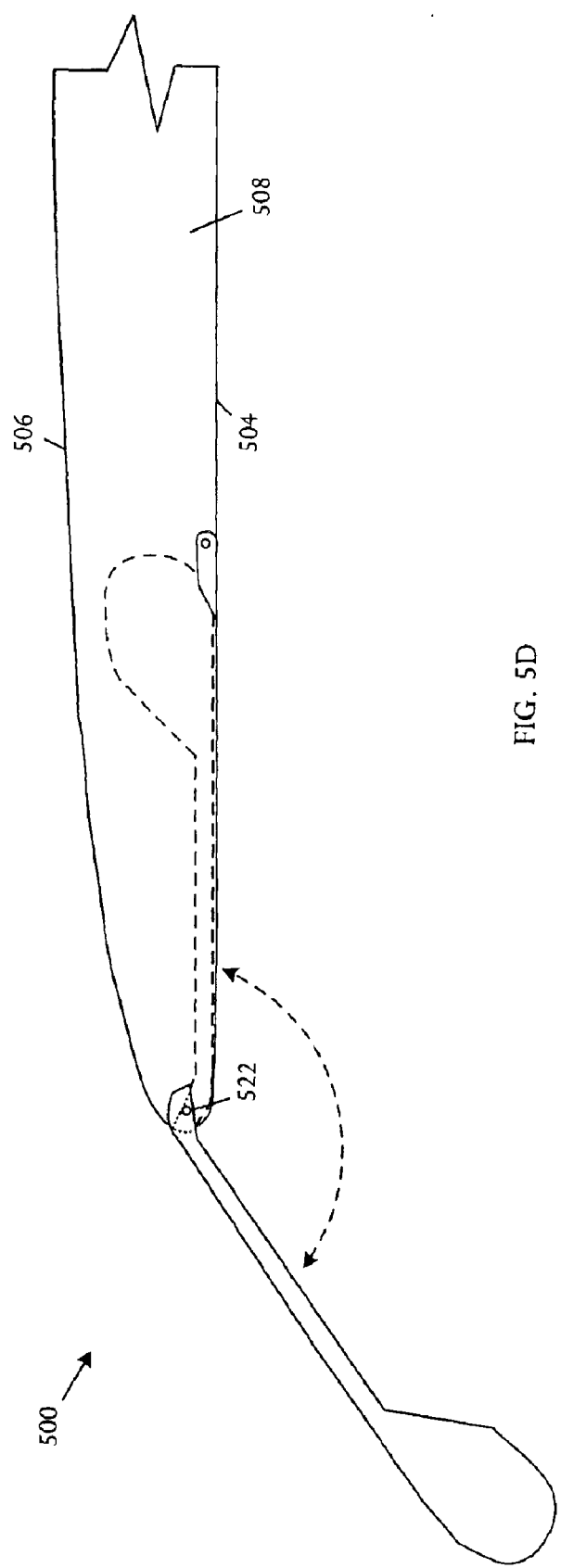

Referring to FIGS. 5C and 5D, pictorial cross-sectional partial airfoil views show two embodiments of Krueger flap arrangements. FIG. 5C shows an embodiment of the Krueger flap 500 in which the location of the Krueger flap 500 on the wing lower surface is chosen so that the curvature of the upper wing surface 506 matches the Krueger flap curvature at 530 for a desired deflection. The matched curvature increases or maximizes the radius at the transition from flap 500 to wing 508, maintaining flow attachment to the wing 508 to result in lower drag. The Krueger flap 500 is attached to the wing 508 below the stagnation point and thereby does not disturb laminar flow on the wing upper surface 506.

FIG. 5D shows an alternative embodiment of a Krueger flap 500 that is simplified, having a single pivot point 522, in comparison to the flap shown in FIG. 5C.

Referring to FIGS. 5A through 5D in combination with FIG. 3, the rounded form 304 of the inboard portion of the leading edge flap 210 smoothly transitions to the form of the Kruger flap at the Krueger flap junction 306 to reduce or minimize any gap in the wing leading edge.

Referring again to FIG. 2, the leading edge 202 of the wing 108 is configured so that the shape of the leading edge flap 210 merges into the form of the Krueger flap 208. In particular, the structure and configuration of the leading edge flap 210 and the Krueger flap 208 are arranged so that when the Krueger flap 208 is deployed, air flow separation over the wing 108 is reduced or minimized. The cross-sectional morphology of the leading edge flap 210 is matched to the Krueger flap 208 to avoid structural discontinuities, protrusions, or gaps that can create a vortex at a position along the leading edge 202, such as at the junction between the Krueger flap 208 and the leading edge flap 210. A vortex formed at the top of the wing 108 corrupts the flow field. The leading edge flap 210 avoids flow field corruption via usage of rounded edges and structures in the Krueger flap 208 and the leading edge flap 210, particularly in the vicinity of the junction.

In various embodiments, the junction between the leading edge flap 210 and the Krueger flap 208 can have some structural discontinuity. For example, the junction can include a step variation, although a gap in flap continuity between the Krueger flap 208 and leading edge flap 210 segments can impact aerodynamic characteristics. In some embodiments, a structural element that smoothes the transition between segments can be used to improve aerodynamic performance. In some embodiments, the structural material can be a flexible material such as rubber, plastic, a synthetic, and the like.

The particular structure of the Krueger flap 208 and the leading edge flap 210 can vary depending on the wing configuration. For example, whether the leading edge 202 is a true supersonic leading edge. In particular, whether the leading edge is contained within the Mach cone of the aircraft. If the leading edge 202 is inside the Mach cone, structural discontinuities, protrusions, and gaps are to be avoided. For a leading edge 202 that is outside the Mach cone, the leading edge flap 210 can include more irregular structures such as a sharp edge transitioning to a Krueger flap structure.

Any suitable element or structure can be used to mate the Krueger flap 208 and the leading edge flap 210 when either stowed or deployed. Generally, the portions of the Krueger flap 208 and the leading edge flap 210 at the junction can be formed so that the edges of each have similar shape, thereby reducing or eliminating structural discontinuity at the junction.

Figure 6A:
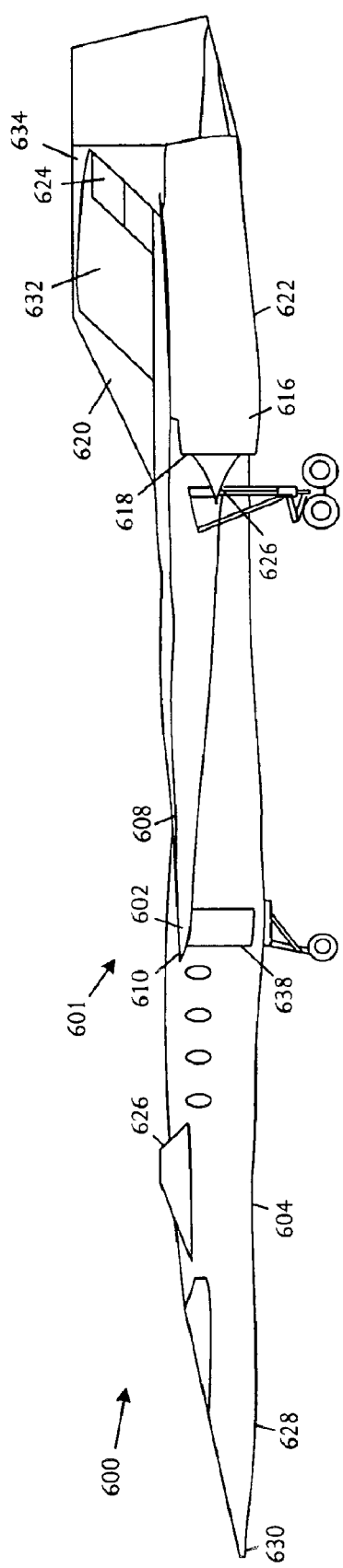
Figure 6C:
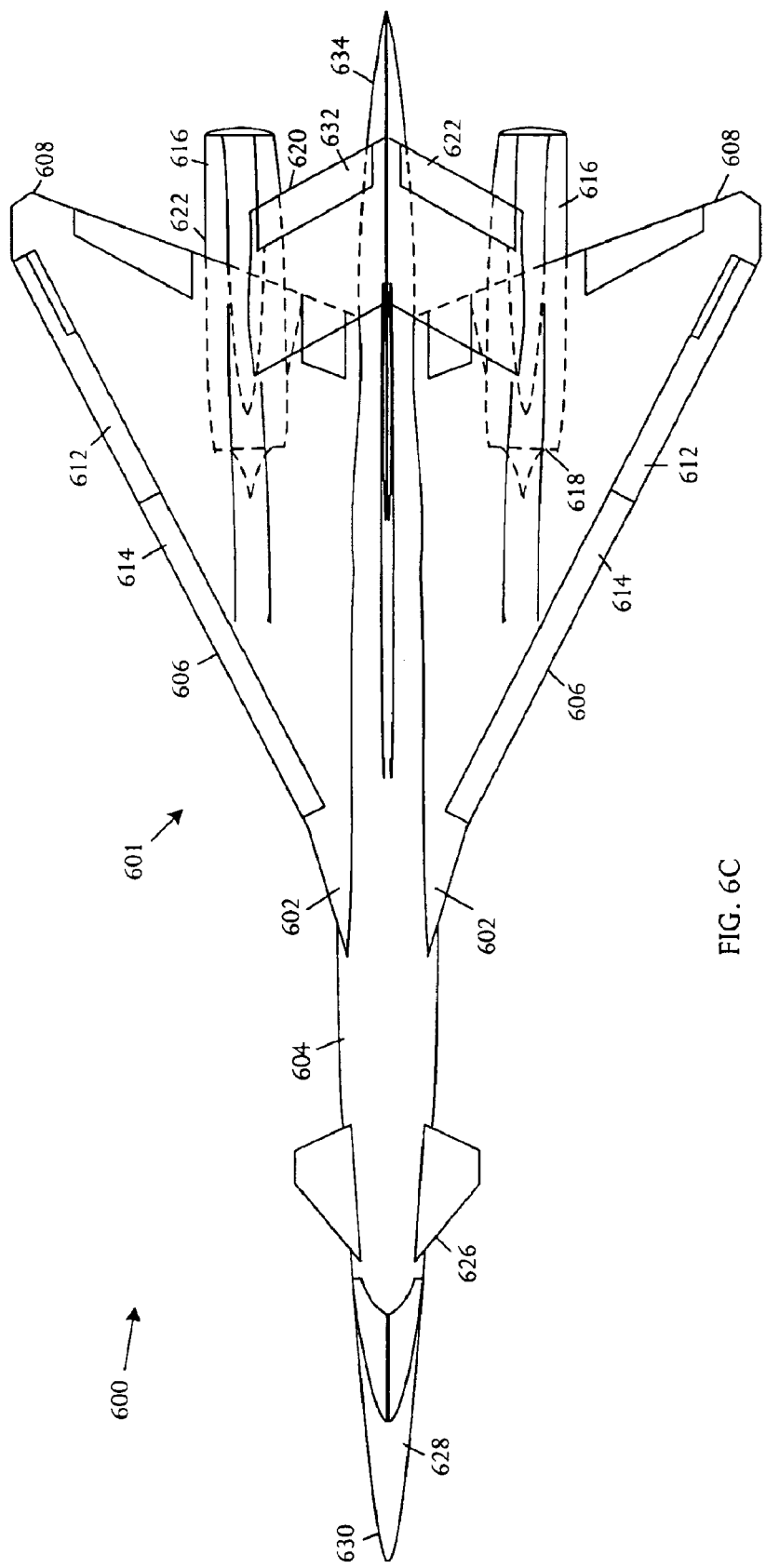

Referring to FIGS. 6A, 6B, and 6C, schematic pictorial diagrams respectively showing side, front, and top views of a supersonic aircraft 600 with an aircraft lift device 601 that, in various embodiments, is capable of improving aircraft performance by facilitating positive aerodynamic effects including adjustment of flow fields to improve aerodynamics at a range of air speeds and maintaining a low sonic boom signature. The aircraft 600 comprises a fuselage 604 and an aircraft wing 608 coupled to the fuselage 604. The wing 608 has a leading edge 606. The wing 608 extends from an inboard edge at the fuselage 604 to an outboard edge at the wing tip. The aircraft lift device 601 further comprises a strake 602 capable of coupling to the fuselage 604 and extending to the leading edge 606 of the wing 608. The aircraft 600 further comprises a Krueger flap 614 coupled to the leading edge 606 of an inboard portion of the wing 608 adjacent the strake 602, and a leading edge flap 612 coupled to the leading edge 606 of the wing 608 and extending from a junction at the Krueger flap 614 to an outboard portion of the wing 608.

The aircraft 600 further comprises a control element, such as the control linkage 510 depicted in FIGS. 5A and 5B for the Krueger flap 614 and similar control elements for the control flap associated with the strake 602 and the leading edge flap 612. The control element is used to adjust the leading edge control surfaces of the wings 608 to improve aerodynamic flow fields for flight at Mach numbers different from the Mach number to which the aircraft design is optimized.

In illustrative embodiments, the aircraft 600 has engines 616 positioned in aft locations beneath the wings 608 and have a highly integrated wing/inlet geometry 626 to produce low-boom compatibility and low inlet/nacelle installation drag. The aircraft 600 can have an inverted V-tail geometry 632 that generates low-sonic-boom longitudinal trim in cruise and structural support for the engines 616.

In the illustrative embodiment, the aircraft 600 has an elongated nose 628 with a nose tip 630 and an inverted V-tail surface 632 that overlaps the wing 608, features that facilitate low-sonic-boom aircraft performance. The configuration suppresses features of a sonic boom pressure waveform that otherwise would make the boom loud. Rapid pressure rises at the front and rear of the pressure wave producing the characteristic double explosion of the sonic boom that is ameliorated in the illustrative design by various structural and operational improvements including the wing leading edge structures and control techniques described herein.

The tip 630 of the nose 628 can create a pressure spike ahead of the aircraft forward shock, raising local temperature and sound velocity, thereby extending the forward shock and slowing the pressure rise. The supersonic aircraft 600 has a sharply swept arrow wing configuration 608 that reduces peak overpressure in the wave by spreading wing lift along the aircraft length. The wing configuration 608 has reduced wing leading and trailing edge sweeps.

The illustrative aircraft arrangement 600 has twin non-afterburning turbofan engines 616 set below and behind the wing 608. The non-afterburning turbofan engines 616 operate behind simple fixed-geometry axisymmetric external compression inlets 618. Other engines may be used in other embodiments. Considerations of community noise and takeoff, transonic, and cruise thrust specifications determine engine cycle selection and engine sizing.

The shaping of the supersonic aircraft 600 including aspects of the wing 608, the tail assembly or empennage 620, and the engine 616 structural integration are adapted according to sonic boom signature and supersonic cruise drag considerations. The empennage or tail system 620 includes stabilizers, elevators, and rudders in the inverted V-tail geometry 632. The inverted V-tail geometry 632 supports nacelles 622 in highly suitable positions relative to the wing 608 to suppress boom, and trims the supersonic aircraft 600 in cruise to attain an improved low-boom lift distribution. Panels of the inverted V-tail 632 support the nacelles 622 and non-afterburning turbofan engines 616 in combination with support of the wing 608 to handle flutter. Inverted V-tail control surfaces, termed ruddervators 624, adjust aircraft longitudinal lift distribution throughout the flight envelope to maintain a low boom, low drag trim condition.

The shape of the fuselage 604, the wing 608, and empennage 620 are integrated with the entire aircraft configuration so as to be conducive to attaining a low-boom signature and supersonic cruise drag levels. The wing 608 and/or fuselage 604 form an airfoil having aerodynamic characteristics appropriate for low-boom supersonic and transonic flight.

The wings 608 can have a substantial dihedral, or "gulling" incorporated into the wings 608 inboard of the engines 616. The dihedral geometry is most pronounced at the wing trailing edge. The gull or dihedral results from twisting and cambering the wing 608 for low-boom and low induced drag while preserving a tailored local wing contour in the position of main landing gear retraction.

In some embodiments, the inboard portion of the wing 608 can be configured to integrate with the nacelle 622 and a diverter formed between the nacelle 622 and the wing 608 to follow the contour of a low-sonic-boom fuselage 604 with as close a normal intersection as possible to attain low interference drag. In some embodiments, an inboard flap hinge line is fully contained within the wing contour with the wing upper and lower surfaces held as planar as possible to facilitate seal design.

With the resulting wing configuration, the wing gull raises the engines 616 to increase available tipback angle and reduce thrust-induced pitching moments. The gull enhances low-boom signature by vertically staggering the wing longitudinal lift distribution and lowers the aircraft body or fuselage 604 to reduce the height of the cabin door 638 above the ground, thereby reducing entry stair length. The low fuselage 604 assists in maintaining a low aircraft center of gravity, reducing tipover angle and promoting ground stability. The wing gull forms a wrapping of the wing 608 around the nacelle 622 that enhances favorable interference between the inlets 618 and the wing 608, resulting in a wing/body/nacelle geometry conducive to successful ditching and gear-up landings.

The leading edge surfaces of the wing 608, including the leading-edge flap of the strake 602, the Krueger flap 614, and the leading edge flap 612 are controlled by one or more control elements to adjust aerodynamic flow fields, thereby improving aerodynamic performance in operation at various airspeeds. In addition, the leading edge surfaces can be controlled to adjust the leading-edge flow field to maintain a low sonic boom signature. In some conditions, the control elements can deflect the strake 602 to reduce lift ahead of spillage at an off-design condition and maintain a low sonic boom signature.

Referring to FIGS. 7A, 7B, 7C, and 7D, a series of graphs illustrate theory upon which a low sonic boom signature is attained by controlling the leading edge flaps of the wings 608, reducing sonic boom loudness while maintaining long supersonic range. The leading edge control elements reduce sonic boom loudness by shaping the sonic boom for low shock strengths. FIG. 7A is a graph showing the pressure distribution from a conventional supersonic aircraft. The pressure distribution coalesces into an N-wave at the ground, a shape corresponding to the largest shock strength and thus the greatest loudness. One technique for reducing sonic boom amplitude at the ground involves a minimization theory in which a pressure distribution caused by a low boom aircraft follows an inversely calculated distribution to generate low shock strength at the ground. Contrary to intuition, a low boom distribution occurs when a strong leading edge compression quickly reduces in magnitude, followed by a gradually increasing weak compression that rapidly inverts into a weak expansion, followed by a stronger trailing edge compression that gradually recompresses to ambient. Boom minimization occurs when an aircraft produces an inversely calculated pressure distribution without sacrificing performance. The pressure distribution produced by an aircraft results from a Mach angle, cross-sectional area distribution, for example as shown in FIG. 7B, and a Mach angle lift distribution, as shown in FIG. 7C. The leading edge devices can include the strake leading edge flaps, the Krueger flaps, and the outboard leading edge flaps, individually or in various combinations, operate to shift the lift distribution of the aircraft and shape the active area distribution to reduce sonic boom amplitude at the ground. A minimized pressure distribution, shown in FIG. 7D, occurs when the sum of the area pressure distribution and the lift pressure disturbance equal the minimized pressure distribution. The leading edge devices described herein can be used to shape the pressure distribution.

Figure 8:
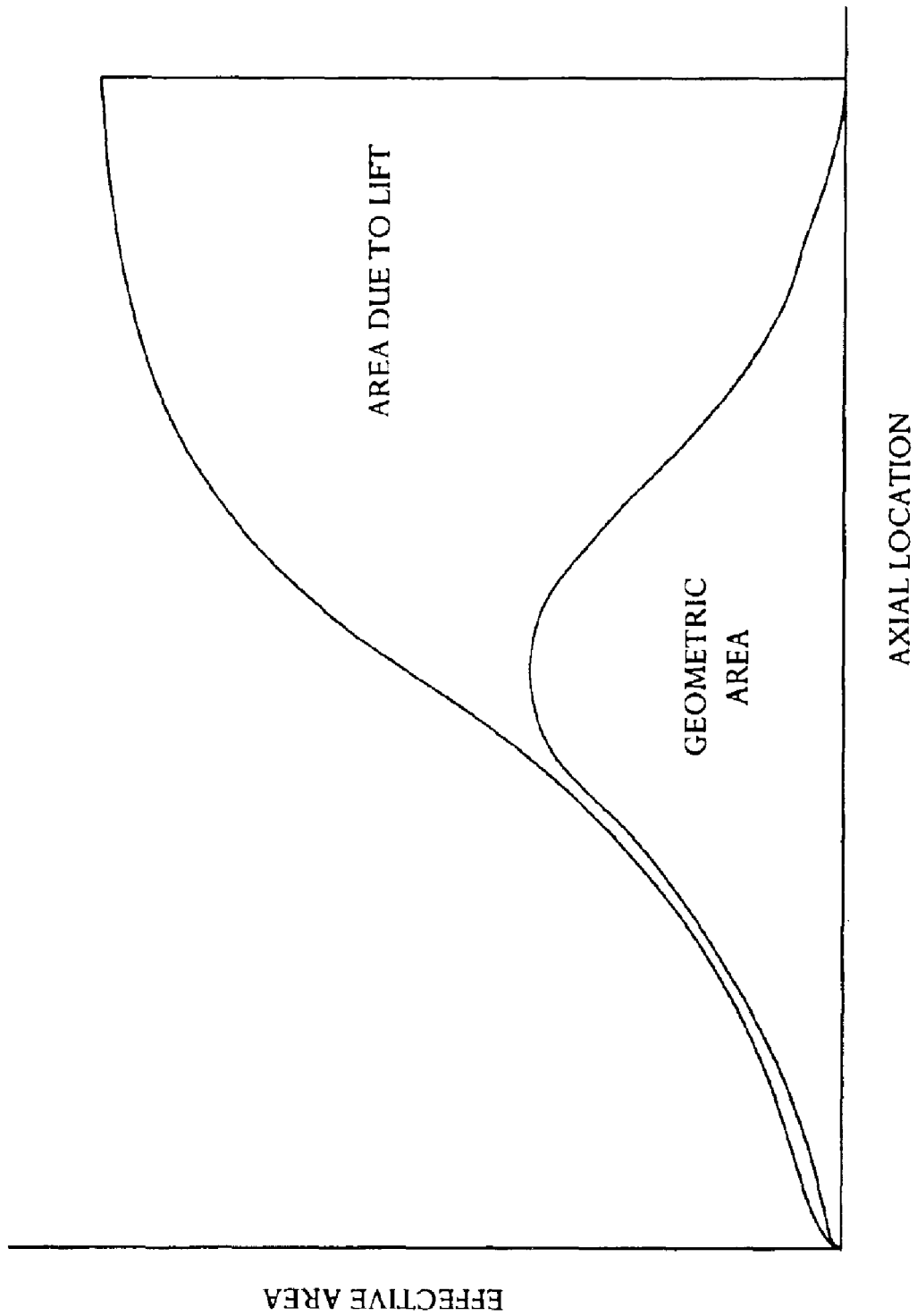
FIG. 8 is a graph that further illustrates theory of equivalent area minimization to reduce sonic boom signature, showing effective area against axial location along the longitudinal axis of the aircraft.

Referring to FIG. 8, a graph further illustrates theory of equivalent area minimization to reduce sonic boom signature, showing effective area against axial location along the longitudinal axis of the aircraft. When equivalent area due to geometric area and lift sum to the minimized distribution, a minimized ground sonic boom occurs. The leading edge surfaces are controlled to modify the airflow over the wing 608, stretching the lifting length to move the active area distribution closer to the distribution that shapes the sonic boom signature and maintains a clean flow of air over the wing 608, clearing any vortices from the wing 608. Accordingly, the leading edge flaps including the flaps of the strake 602, the Krueger flaps 614, and the leading edge flaps 612, can be controlled to create an area distribution for sonic boom shaping to a desired target.

Referring again to FIG. 6, the illustrative aircraft 600 utilizes control of the leading edge control surfaces, including one or more of the leading edge flap of the strake 602, the Krueger flap 614, and the leading edge flap 612, in accordance with an equivalent area technique to reduce sonic boom signature. Equivalent area is the Mach angle area distribution of an axisymmetric body that generates the same disturbance as a given geometric area or given lift distribution. The equivalent area due to geometric area can be approximated as equal to the Mach angle area distribution. The equivalent area due to lift is equal to the integral of the Mach lift per unit of streamwise length times atmospheric constants.

In the illustrative embodiment, the leading edge control surfaces are controlled to reduce or minimize sonic boom by deflecting the air flow to reduce lift ahead of the spillage due to nacelles 622. For example, if the aircraft 600 is flying in an off-design condition in which the nacelles 622 are spilling air and are thus generating stronger shocks and stronger compressions, the leading edge control surfaces and be actuated to compensate by creating an expansion of air flow that blocks the spillage.

The wings and engine are generally designed for selected for usage at various air speeds. Engine 616 and inlet 626 characteristics are configured to coordinate engine airflow schedules and flight Mach number. In a particular embodiment, a fixed geometry inlet 626 can be utilized, for example to reduce propulsion system weight and complexity, and thereby improve efficiency and performance. In particular fixed-geometry inlet configurations, airflow is matched at all pertinent Mach numbers so that no bypass or excessive subcritical spillage occurs under nominal conditions. Airflows at off-nominal conditions can be matched using engine trim and a translating engine cowl.

In one embodiment, an inlet/engine configuration is based on a supersonic aircraft engine that maintains a status range of 3600 nautical miles (nmi) at Mach 1.8. The fixed compression geometry engine inlet is optimized for Mach 1.8. A maximum Mach 1.8 capable design represents performance of the Mach 1.8-designed engine cruising at Mach 1.6. The Mach 1.8-capable engine flying at Mach 1.6 increases range and engine life, and potentially improves performance on hot-temperature days.

In an alternative embodiment, an engine 616 is configured with a fixed compression geometry inlet optimized for Mach 1.6, increasing range to approximately 4250 nmi by increasing lift/drag ratio by a full point, and a lower engine weight enabling more fuel to burn in cruise.

Various design techniques can be used to configure an aircraft for a range capability that is greater than a baseline Mach 1.8 point design approach, yet supply a greater speed capability than a Mach 1.6 point design method. One technique is to design a Mach 1.6 inlet and engine and cruise off-design at Mach 1.8 to improve range over a Mach 1.8 design inlet, for example attaining a 150–250 nmi improvement in range. A second technique involves designing the aircraft as a Mach 1.6 point design for maximum and accepting any overspeed capability that happens to occur, resulting in a small speed increase for a fully optimized Mach 1.6 engine design that is further limited by engine life reduction as well as degradation of inlet stability and distortion. In a slight variation to the second approach, the engine can be configured as a Mach 1.6 point design with the engine and subsystem design Mach numbers tailored to any speed a Mach 1.6 inlet is capable of attaining in an overspeed condition. The range benefit is even smaller than the effect of a pure Mach 1.6 aircraft but the overspeed capability can be improved although not to the level of a Mach 1.8 design. A third approach incorporates a variable geometry inlet into an otherwise Mach 1.8 configuration so that efficient on-design inlet performance can be obtained from a range from Mach 1.6 to Mach 1.8, resulting in a small range penalty due to higher weight and higher losses inherent to the variable geometry inlet. Mach 1.6 performance of the third approach is further hindered due to increased inlet weight.

In a fourth approach, the inlet design Mach number is set such that a Mach 1.8 cruise can be attained in an overspeed condition with engine, subsystem, and aerodynamic design configured to maximize range at Mach 1.6. The illustrative concept does not operate on-design in a purest sense, although enabling the largest range of a fixed compression geometry inlet capable of cruising at Mach 1.8. Potentially, flight at a lower than design Mach number using the fixed geometry external compression engine and translating engine cowl can increase spillage drag and integrate the inlet and propulsion system in a manner that results in a higher drag.

An illustrative aircraft 600 can have inlet 626, engine 616, and airframe generally designed for Mach 1.8 performance, and further includes optimizations to improve various performance aspects. The configuration enables cruising at a slightly lower Mach number than 1.8 to attain a higher range performance. In an illustrative embodiment, the wings are sized slightly larger than normal for a Mach 1.8 design to improve takeoff and landing performance.

The control elements operating the leading edge flap of the strake 602, the Krueger flap 614, and the leading edge flap 612 can be controlled to further facilitate operation of the aircraft 600 at off-design Mach numbers.

Other mission-related characteristics facilitated by control of the leading edge surfaces include a capability to cruise at lower Mach numbers, and a tendency to cruise at lower altitudes at lower Mach numbers, resulting from an optimum lift coefficient occurring at lower altitude as a consequence of lower speed. Furthermore, suitable engines for the desired Mach performance typically produce lower specific fuel consumption at the lower altitudes. Also, lower cruise altitudes yield excess thrust at cruise, enabling a reduction is engine cruise thrust requirement and reduced engine weight. Additionally, lower cruise altitudes allow cruise to begin earlier and end later in a mission so that the aircraft spends proportionately more of a mission in a cruise condition. Also, lower cruise Mach numbers yield lower total air temperatures, benefit engine and subsystem life. Lower cruise Mach numbers can also reduce emissions.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. An aircraft lift device comprising:
   a strake capable of coupling to an aircraft fuselage and extending a leading edge of a wing, the strake having a leading edge;
   a leading-edge flap mounted on the strake leading edge; and
   a swept hinge line coupling the leading-edge flap to the strake that enables strake leading edge flap rotation without unsealing the flap from the aircraft fuselage.

2. The lift device according to claim 1 further comprising:
   a control element coupled to the leading-edge flap and configured to adjust the leading-edge flap in an arrangement that tailors aerodynamic flow fields for flight at Mach numbers different from the Mach number to which the aircraft design is optimized.

3. The lift device according to claim 1 further comprising:
   a control element coupled to the leading-edge flap and configured to adjust the strake leading-edge flap in an arrangement that reduces lift ahead of spillage at an off-design condition and maintains a low sonic boom signature.

4. The lift device according to claim 1 further comprising:
   a control element coupled to the leading-edge flap and configured to adjust the leading-edge flap in an arrangement that, as Mach number is reduced, moves influence of the leading edge stake flap ahead of the wing so that the flap optimal deflection changes when Mach number changes.

5. An aircraft lift device comprising:
   an aircraft wing adapted to couple to an aircraft fuselage and having a leading edge, the wing extending inboard to outboard;
   a strake coupled to the aircraft fuselage and extending to the leading edge of the wing, the strake further comprising a leading-edge flap coupled to the strake at a swept hinge line enabling strake leading edge flap rotation without unsealing the flap from the aircraft fuselage; and
   a Krueger flap coupled to the leading edge of an inboard portion of the wing adjacent the strake and having upper and lower surfaces, wherein
   the strake leading-edge flap is configured as a leading-edge device that, upon controllable deflection in a subsonic condition, creates an airflow field impinging on the Krueger flap so that the upper surface airflow field reduces or eliminates inboard vortices.

6. The lift device according to claim 5 further comprising:
   a leading edge flap coupled to the leading edge of the wing and extending from a junction at the Krueger flap to an outboard portion of the wing.

7. The lift device according to claim 5 wherein:
   the leading edge flap shape smoothly transitions to the Kruger flap shape at the Krueger flap junction and reduces or minimizes gap in the wing leading edge.

8. The lift device according to claim 5 further comprising:
   a strake leading-edge simple flap device mounted on a leading edge of the strake.

9. The lift device according to claim 5 wherein:
   the wing and strake are configured as a swept wing that extends at a sweep angle from the fuselage.

10. The lift device according to claim 5 wherein:
    the wing and strake are configured as a swept wing that extends in multiple sweep angle segments from the fuselage, whereby the sweep angle of the wing differs from the sweep angle of the strake.

11. The lift device according to claim 5 wherein:
    the wing and strake are configured as a swept wing that extends in multiple sweep angle segments from the fuselage, the sweep angle of the wing segment inboard of the Krueger flap junction differing from the sweep angle of the wing segment outboard of the Krueger flap junction.

12. An aircraft comprising:
    a fuselage;
    an aircraft wing coupled to the fuselage and having a leading edge, the wing extending inboard to outboard;
    a strake coupled to the fuselage and extending to the leading edge of the wing, the strake further comprising a strake leading-edge flap coupled to the strake at a swept hinge line enabling strake leading edge flap rotation without unsealing the flap from the aircraft fuselage;
    a Krueger flap coupled to the leading edge of an inboard portion of the wing adjacent the strake; and
    a wing leading edge flap coupled to the leading edge of the wing and extending from a junction at the Krueger flap to an outboard portion of the wing; wherein
    the wing leading edge flap is a simple leading edge flap has a cross-sectional form transitioning from a pointed shape outboard to a rounded shape at the Krueger flap junction.

13. The aircraft according to claim 12 wherein:
    the wing and strake are configured as a swept wing that extends at a sweep angle from the fuselage.

14. The aircraft according to claim 12 wherein:
    the wing and strake are configured as a swept wing that extends in a plurality of sweep angle segments from the fuselage, the sweep angle of the wing differing from the sweep angle of the strake.

15. The aircraft according to claim 12 wherein:
    the wing and strake are configured as a swept wing that extends in a plurality of sweep angle segments from the fuselage, the sweep angle of the wing segment inboard of the Krueger flap junction differing from the sweep angle of the wing segment outboard of the Krueger flap junction.

16. The aircraft according to claim 12 further comprising:

a control element coupled to one or more of the wing leading-edge flap, the Krueger flap, and the strake leading edge flap, and configured to adjust the leading-edge surface in an arrangement that tailors aerodynamic flow fields for flight at Mach numbers different from the Mach number to which the aircraft design is optimized.

17. The aircraft according to claim 12 further comprising:

a control element coupled to one or more of the wing, leading-edge flap, the Krueger flap, and the strake leading edge flap, and capable of adjusting the leading-edge surface to deflect the wing leading edge to reduce lift ahead of spillage at an off-design condition, maintain a low sonic boom signature.

* * * * *